July 7, 1964            A. P. RYAN            3,139,956

EMERGENCY BRAKE FOR TRACTORS AND TRAILERS

Filed Nov. 14, 1960            4 Sheets-Sheet 1

INVENTOR
A. P. RYAN

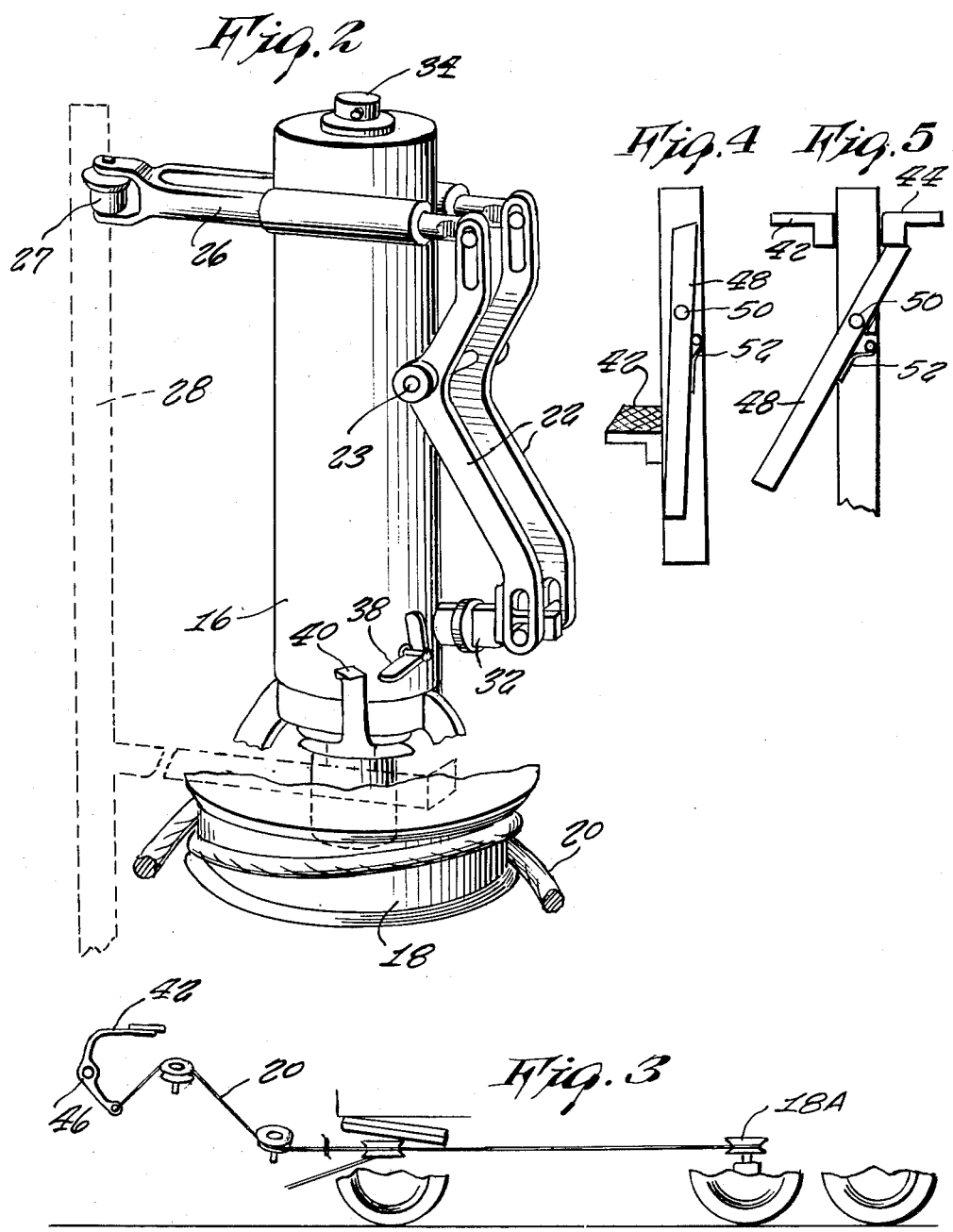

July 7, 1964
A. P. RYAN
3,139,956
EMERGENCY BRAKE FOR TRACTORS AND TRAILERS
Filed Nov. 14, 1960
4 Sheets-Sheet 3
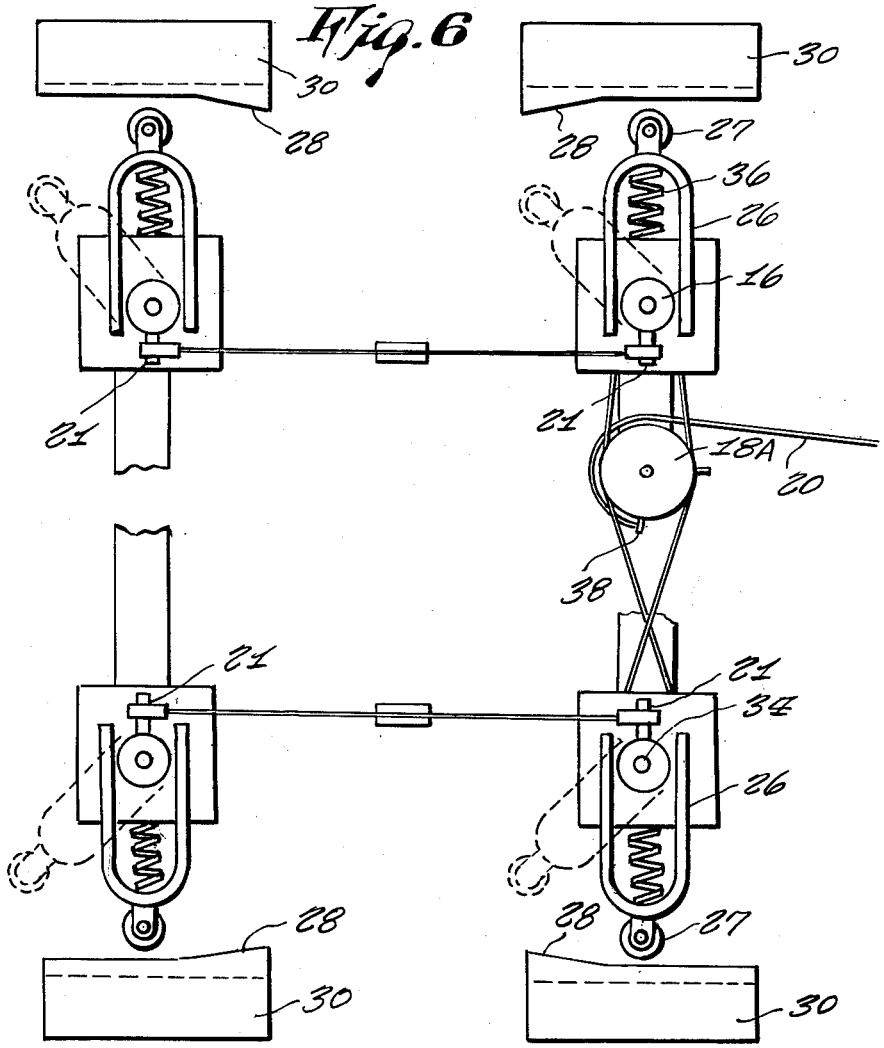
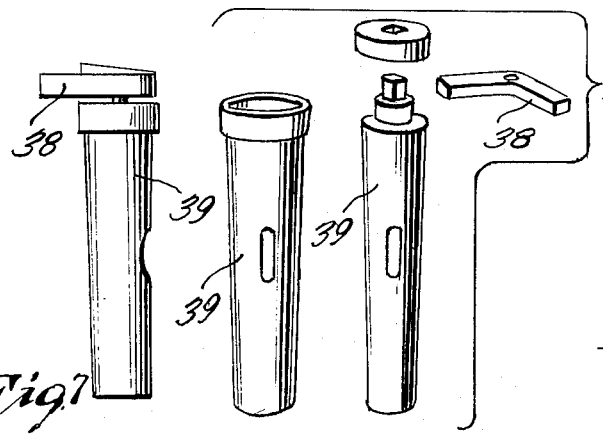
INVENTOR
A. P. RYAN

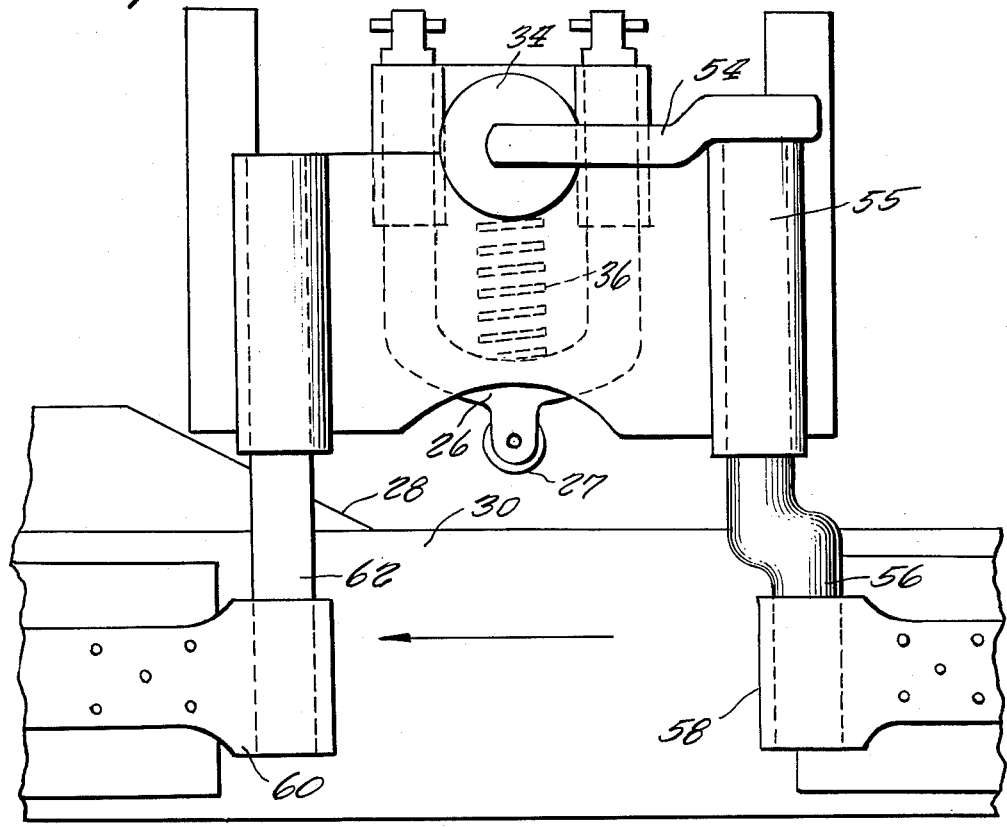
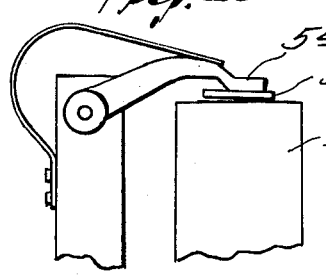
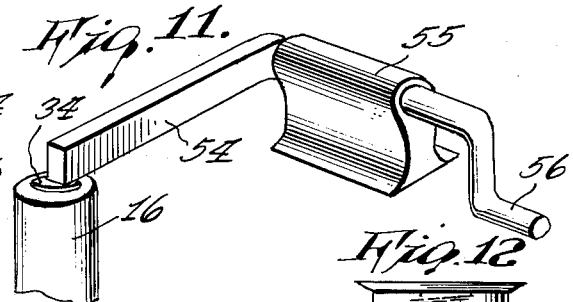
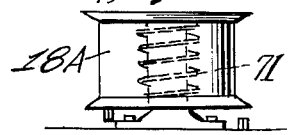

United States Patent Office 3,139,956
Patented July 7, 1964

3,139,956
EMERGENCY BRAKE FOR TRACTORS
AND TRAILERS
Arthur P. Ryan, 35 Health St., Dansville, N.Y.
Filed Nov. 14, 1960, Ser. No. 69,044
1 Claim. (Cl. 188—152)

This invention relates to road vehicles and, more particularly, to a brake system for tractors and trailers.

It is an object of the present invention to provide an emergency brake for tractors and trailers which can be effectively actuated by the forward movement of the vehicle in the event that the ordinary running brakes of the vehicle become ineffective.

A further object of the present invention is to provide a set of emergency brakes for tractors and trailers which can be readily applied to all existing vehicles, and driven by the rotation of the wheels of the vehicle in the absence of ordinary power required for operating the running brakes of the vehicle.

An additional object of the present invention is to provide a set of mechanically controlled and pump actuated brakes for tractors and trailers which will enable the vehicle to be brought to a stop in the event that the ordinary brake system of the vehicle fails.

Other objects of the invention are to provide an emergency brake system for tractors and trailers bearing the above objects in mind, which is of simple construction, has a minimum number of parts, is inexpensive to manufacture, and efficient in operation.

For other objects and for a better understanding of the invention, reference may be had to the following detailed description, taken in conjunction with the accompanying drawing, in which:

FIGURE 2 is a perspective view of certain parts of the assembly shown in FIGURE 1;

FIGURE 3 is a schematic diagram of the assembly illustrating the installation of the brake system;

FIGURE 4 is a plan view of a safety mechanism controlling the sequence of operation of the pedals and showing the mechanism in an initial position;

FIGURE 5 is a view similar to FIG. 4 showing the safety mechanism control in an operative position;

FIGURE 6 is a schematic layout of a complete brake system made in accordance with the present invenion in actual use;

FIGURE 7 is a side elevational view of a valve assembly forming another part of the present invention;

FIGURE 8 is an exploded perspective view of certain operating parts of the valve mechanism shown in FIGURE 7;

FIGURE 9 is an enlarged plan view of certain operating parts of one sub-assembly forming a part of the present invention;

FIGURE 10 is a fragmentary side elevational view of certain parts of the assembly shown in FIGURE 9;

FIGURE 11 is a fragmentary perspective view of certain other operating parts of the present invention;

FIGURE 12 is a side elevational view of a sheave member forming still another part of the present invention.

Figure 1:
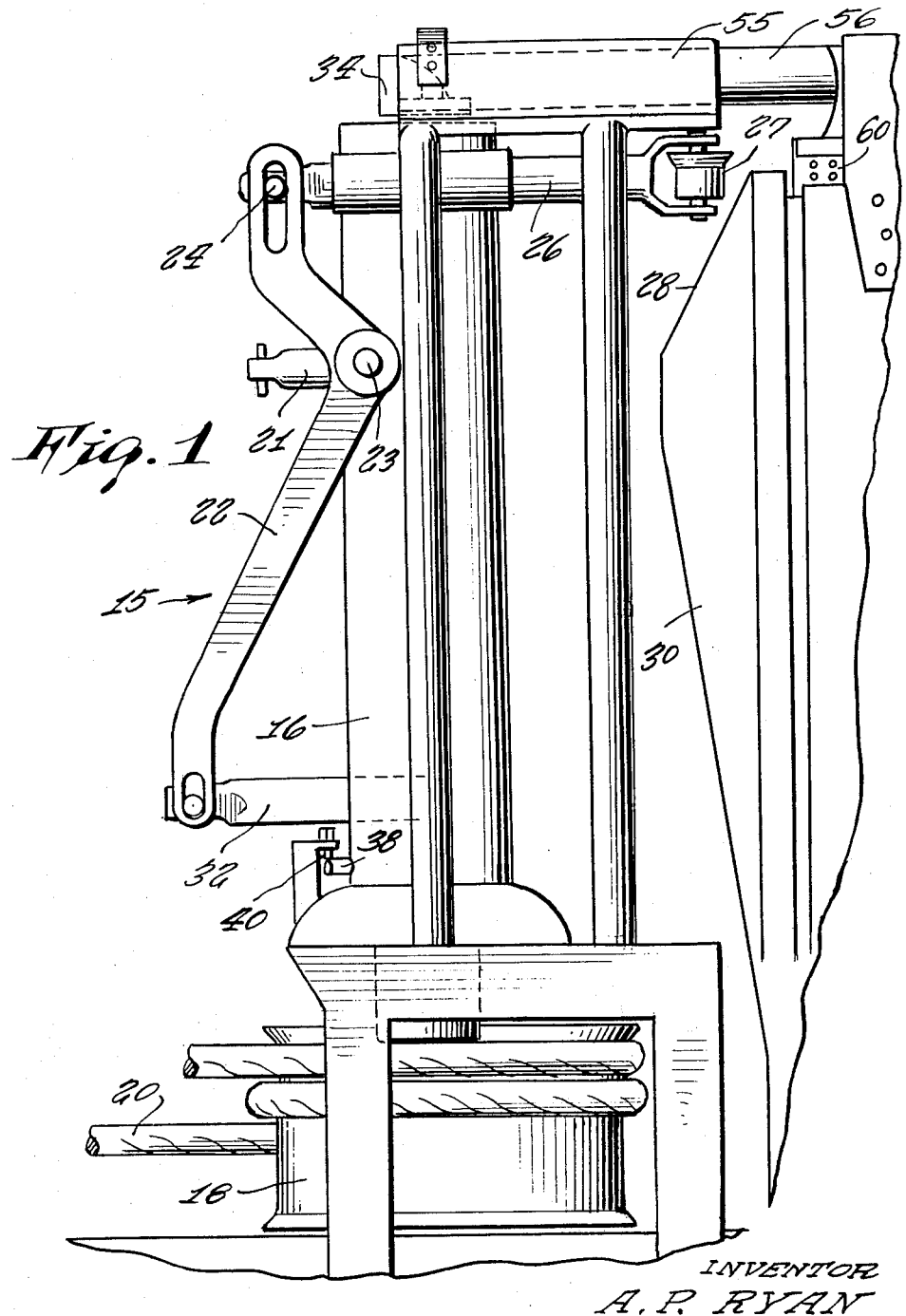
FIGURE 1 is a fragmentary plan view of a main operating assembly of the present invention.

Referring now more in detail to the drawing, a brake system for vehicles made in accordance with the present invention is shown to include a main control assembly 15 for association with each brake drum 30 of the vehicle, including the tractor portion and trailer portion thereof.

Each main assembly 15 includes a hydraulic pump 16 which is selectively rotated to adjust its positions by means of a sheave 18 under the control of a flexible cable 20 leading to individual brake pedals 42, 44, in the cab of the vehicle.

A crank lever 22 pivotally mounted upon a pivot pin 23 on the side of the chamber 16 has a slotted end drivingly connected to an actuating arm 26 having a follower 27 rotatably supported at one end for engagement with a cam surface 28 of one inside surface of the brake drum 30. The opposite end of the lever 22 is drivenly connected to a reciprocating pin 32 which is operative to actuate the chamber 16 as the follower 27 is rotated into driven engagement with the cam surface 28 of the brake drum. Mounting pins 21 carried by each chamber 16 facilitate the rotation of the chambers in a manner hereinafter more fully described.

A piston 34 carried by the chamber 16 is in pressure engagement with one end of a crank 54 secured to one end of a brake band actuating shaft 56 rotatably mounted upon a sleeve 55 carried by the brake band supporting frame of the brake drum. The follower arm 26 is provided with a centering spring 36, which normally urges the respective pump assembly into the operating position shown in FIGURE 6.

The lower end of each chamber 16 is provided with a valve assembly 39 having an actuating lever 38 controlled by a positioning lug 40.

It is to be noted that a ball or roller bearing is installed at the bottom of the pump and a bronze sleeve bearing is installed at the top thereof.

A pair of brake pedals 42, 44 are pivotally mounted upon a bearing within the cab of the vehicle, with a stop bar 43 pivotally mounted by means of a pin 50 upon a stationary object between the brake pedals biased toward a blocking position with the brake pedal 44 controlling the tractor of the vehicle, until the trailer brake pedals 42 is first applied, thus rotating the bar 48 out of engagement with the pedal 44. This prevents application of the brakes to the tractor prior to braking the trailer.

The exact counterpart of construction illustrated in the front part of FIG. 6 may be used for the tractor brake. However, in such construction, pins 21 will not be present and drum 18 will be advanced toward the front part of the tractor in order to afford sufficient clearance between the gear housing on the axle. The brake will be on the right side of the cab and will require only one idler sheave to give proper direction of operation to the cable. The drum and sheave may be attached under the truck frame at a point that will furnish proper alignment.

It will now be recognized that the pedals 42, 44 control the cable 20 so as to simultaneously rotate the respective hydraulic pump units into driven engagement with the cam surfaces 28 of the brake drums 30 that serve to reciprocate the levers 22 to actuate the pin 32 to produce a pumping action in the chamber 16, thus extending the piston 34 and applying pressure to the brake band 60 through the eccentric pin 56 mounted upon the sleeve 55 when the cylinder 16 has been rotated to the full line position shown in FIGURE 6 and the trip 40 has closed the valve lever 38, providing for the extension of the piston 34 upon continued reciprocating movement of the levers 22 under the action of the follower arm 26 by the brake drum 30. When the brake pedals are removed, the springs 36 will return the pump units to the normal broken line position shown in FIGURE 6, during which movement the lug 40 will trip the valve member 38 allowing the pumps to vent, thus allowing the pistons 34 to be retracted into the pump units and releasing pressure upon the brake bands 60.

While various changes may be made in the detail construction, it shall be understood that such changes shall be within the spirit and scope of the present invention, as defined by the appended claim.

What I claim as new and desire to protect by Letters Patent of the United States is:

An emergency brake for road vehicles having a plurality of brake drums comprising a plurality of sub-assemblies, one for each brake drum, each sub-assembly including a brake band encircling said brake drum and an operator therefor and a hydraulic pump and motor unit for actuating said operator, each pump of said unit including a piston, a follower carried by each of said units for actuating said piston, each of said brake drums including a cam for operating said follower, each of said sub-assemblies being rotatably mounted on said vehicle adjacent respective brake drums, whereby rotation of said unit moves said follower into position for actuating said pump by said camming means, thereby operating said motor to actuate said brake bands.

References Cited in the file of this patent

UNITED STATES PATENTS

| | | |
|---|---|---|
| 677,709 | Stacy | July 2, 1901 |
| 786,807 | Harrington | Apr. 11, 1905 |
| 811,507 | Kalisch | Jan. 30, 1906 |
| 1,610,755 | Decker | Dec. 14, 1926 |